(12) United States Patent
Arrive

(10) Patent No.: US 11,816,466 B2
(45) Date of Patent: Nov. 14, 2023

(54) ELECTRONIC DEVICE WITH FIRMWARE, AND METHOD OF OPERATING THEREOF

(71) Applicant: STMicroelectronics (Grand Ouest) SAS, Le Mans (FR)

(72) Inventor: Fabien Arrive, Chasné-sur-illet (FR)

(73) Assignee: STMICROELECTRONICS (GRAND OUEST) SAS, Le Mans (FR)

( * ) Notice: Subject to any disclaimer, the term of this patent is extended or adjusted under 35 U.S.C. 154(b) by 0 days.

(21) Appl. No.: 16/936,224

(22) Filed: Jul. 22, 2020

(65) Prior Publication Data

US 2021/0034352 A1 Feb. 4, 2021

(30) Foreign Application Priority Data

Jul. 30, 2019 (FR) ...................................... 1908696

(51) Int. Cl.
*G06F 9/44* (2018.01)
*G06F 8/65* (2018.01)
*G06F 21/57* (2013.01)

(52) U.S. Cl.
CPC .............. *G06F 8/65* (2013.01); *G06F 21/572* (2013.01); *G06F 2221/033* (2013.01)

(58) Field of Classification Search
CPC ........................................................ G06F 8/65
USPC ......................................................... 717/170
See application file for complete search history.

(56) References Cited

U.S. PATENT DOCUMENTS

| | | | | |
|---|---|---|---|---|
| 6,009,524 A | * | 12/1999 | Olarig | G06F 21/445 709/225 |
| 6,798,299 B1 | * | 9/2004 | Mar | H03L 7/099 331/111 |
| 7,805,719 B2 | * | 9/2010 | O'Neill | G06F 9/30025 717/168 |
| 8,683,457 B1 | * | 3/2014 | Hughes | G06F 9/445 717/169 |
| 8,732,392 B2 | * | 5/2014 | Byom | G06F 11/08 714/768 |
| 9,098,368 B1 | * | 8/2015 | Delker | G06F 8/61 |
| 9,167,288 B2 | * | 10/2015 | Hatambeiki | H04N 21/42226 |
| 9,223,982 B2 | * | 12/2015 | Adams | G06F 21/57 |
| 10,108,412 B2 | * | 10/2018 | Steshenko | G06Q 20/20 |
| 10,430,263 B2 | * | 10/2019 | Polar Seminario | H04L 67/34 |
| 10,977,367 B1 | * | 4/2021 | Adler | G06F 21/568 |
| 11,157,416 B2 | * | 10/2021 | Cariello | G06F 8/65 |
| 11,159,166 B2 | * | 10/2021 | Lee | G11C 13/0038 |
| 2006/0005046 A1 | * | 1/2006 | Hars | G06F 21/572 713/191 |
| 2006/0282652 A1 | * | 12/2006 | El-Haj-Mahmoud | G06F 9/4408 713/1 |
| 2011/0138166 A1 | * | 6/2011 | Peszek | G06F 21/575 713/2 |
| 2014/0040605 A1 | | 2/2014 | Futral et al. | |
| 2014/0331033 A1 | * | 11/2014 | Liang | G06F 9/445 713/1 |
| 2015/0067314 A1 | * | 3/2015 | Strauss | G06F 21/572 713/1 |

(Continued)

FOREIGN PATENT DOCUMENTS

EP 2704053 A1 5/2014
EP 2729896 A1 5/2014

*Primary Examiner* — Evral E Bodden
(74) *Attorney, Agent, or Firm* — Slater Matsil, LLP

(57) ABSTRACT

An embodiment electronic device includes a memory containing a plurality of copies of firmware of the device.

19 Claims, 3 Drawing Sheets

(56) References Cited

U.S. PATENT DOCUMENTS

| | | | |
|---|---|---|---|
| 2017/0075676 A1* | 3/2017 | Li | G06F 8/65 |
| 2017/0131994 A1* | 5/2017 | Middleton | G06Q 30/0601 |
| 2021/0012008 A1* | 1/2021 | Kim | H04L 9/0891 |
| 2021/0240489 A1* | 8/2021 | Xie | G06F 21/572 |

* cited by examiner

ELECTRONIC DEVICE WITH FIRMWARE, AND METHOD OF OPERATING THEREOF

CROSS-REFERENCE TO RELATED APPLICATIONS

This application claims the benefit of French Application No. 1908696, filed on Jul. 30, 2019, which application is hereby incorporated herein by reference.

TECHNICAL FIELD

The present disclosure generally concerns electronic devices and methods, and, more specifically, electronic devices comprising firmware, and methods of operating thereof.

BACKGROUND

Certain electronic devices comprise a data processing unit capable of executing programs. For example, the processing unit comprises one or a plurality of microprocessors.

Such a device typically comprises firmware. Firmware means a program which has to be executed by the processing unit in order for the device to operate, the program being stored in the device, that is, contained in a memory of the device.

SUMMARY

An embodiment overcomes all or part of the disadvantages of known electronic devices comprising a processing unit, in particular comprising firmware.

An embodiment overcomes all or part of the disadvantages of known firmware.

An embodiment overcomes all or part of the disadvantages of known firmware update methods.

An embodiment provides an electronic device, wherein a memory contains a plurality of copies of firmware of the device.

According to an embodiment, each of said copies is capable of causing, when it is executed by the device, the operation of the device according to the trusted platform module (TPM) standard.

According to an embodiment, the memory further contains, for each of said copies, a signature for checking the validity of said copy.

According to an embodiment, the memory further comprises a program for starting the device, capable of causing, when it is executed by the device, the validity check and the execution of at least one of said copies.

According to an embodiment, the memory comprises a value indicating a copy selected from among said copies.

According to an embodiment, the selected copy corresponds to the most recent version among versions of the firmware.

According to an embodiment, the memory further comprises a common file system accessible to each of said copies.

An embodiment provides a method of operation of an above device.

According to an embodiment, the method comprises executing one of said copies, the executed copy being valid and corresponding to the most recent version among the versions of the valid copies.

According to an embodiment, the method comprises replacing a copy which, among said copies, is non-valid, with another copy which, among said copies, is valid.

According to an embodiment, the method comprises replacing one of said copies with another one of said copies corresponding to a version more recent than that of the replaced copy.

According to an embodiment, the method comprises the reception by said device: of an additional copy of the firmware, wherein values depending on a future position of the additional copy in the memory are replaced with a same predefined value, said predefined value preferably having all its bits equal to a memory erase value; and of said dependent values for each of the positions of said copies in the memory.

According to an embodiment, the method further comprises replacing at least one of said copies with the additional copy and restoring said dependent values corresponding to the position of the replaced copy.

According to an embodiment, the additional copy and/or said dependent values are received in compressed form and are then decompressed.

An embodiment provides an electronic component, preferably comprising a package, comprising a device such as defined hereinabove or capable of implementing a method such as defined hereinabove.

The foregoing and other features and advantages will be discussed in detail in the following non-limiting description of specific embodiments in connection with the accompanying drawings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
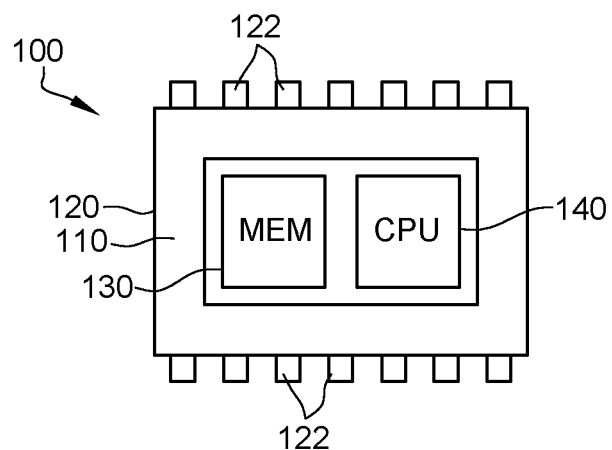
FIG. 1 shows an example of a device to which the embodiments described hereafter apply.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the firmware is not detailed, the described embodiments being compatible with usual firmware.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

FIG. 1 shows an example of a device to which the described embodiments apply. More particularly, the device is a device comprising firmware.

In this example, the device comprises an electronic component 100. The electronic component comprises one or a plurality of electronic integrated circuit chips 110. The or each electronic chip 110 is defined by a semiconductor wafer portion and electronic circuits located inside of and on the wafer. As an example, electronic component 100 further comprises a package 120 comprising the electronic chip(s), typically a tight package having electrically-conductive pins 122 protruding therefrom. Pins 122 are intended to be electrically coupled to other components, preferably welded to a printed circuit board PCB.

The firmware is stored in a memory 130 (MEM). Preferably, memory 130 is non-volatile, more preferably rewritable. For example, memory 130 is of electrically erasable programmable read-only memory, EEPROM, type, such as a memory of the type known as "Flash." Such a Flash memory is defined by a memory comprising transistors, each having a floating gate capable of storing electric charges. Preferably, memory 130 is located inside of package 120, more preferably comprised within chip(s) 110.

Electronic component 100 further comprises a data processing unit 140. Preferably, the processing unit is located in package 120. As an example, the data processing unit is located on the same electronic chip 110 as memory 130.

Preferably, the firmware causes, during its execution by the device (more precisely, by processing unit 140), the operation of the device in accordance with the trusted platform module (TPM) standard according to standard ISO/IEC 11889-1, for example, ISO/IEC 11889-1:2015 or more recent. The device may then form a TPM encryption component. A TPM encryption component is typically used in electronic and/or computer equipment such as computers, tablets, cell phones, etc. or also in various objects or systems said to be connected (that is, connectable to the Internet), such as, for example, motor vehicles or cameras. Such a component is typically used to store encryption keys.

The application of the described embodiments is not limited to the example of the device of FIG. 1. The described embodiments are applicable to any device comprising firmware. In particular, the memory and the processing unit may be located in different packages, or also the device may be comprised within a component, for example, a system on chip, comprising other electronic devices.

Figure 2:
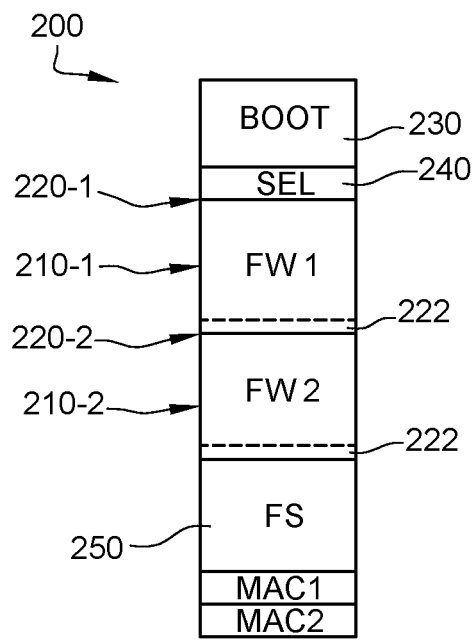
FIG. 2 schematically shows an embodiment of a memory of a device comprising firmware.

FIG. 2 schematically shows an embodiment of a memory of a device comprising firmware. More particularly, the content of a memory 200 has been shown in FIG. 2. In an embodiment, memory 200 replaces the memory 130 of a device of the type in FIG. 1.

Memory 200 is for example of the same type as memory 130 of the device of FIG. 1, that is, preferably a non-volatile rewritable memory, for example, of Flash type. Memory 200 may correspond to one or a plurality of memory banks, located in a same chip or located in a plurality of chips of a same component or of a plurality of different components. According to an embodiment, the elements contained in the memory are in the order of the shown positions, that is, of increasing addresses in the memory, these addresses being physical addresses or, preferably, logic addresses. However, the described embodiments are compatible with all positions of the different elements contained in the memory.

Memory 130 comprises a plurality of copies FWi, or instances, of the firmware (where i is an integer varying from 1 to number N of copies). In a preferred embodiment, such as shown, memory 130 comprises two copies FW1, FW2 of the firmware (N=2). In other embodiments, memory 130 may comprise more than two copies of the firmware. The copies of the firmware are stored in a manner that is directly executable by the device at the position where they are located in the memory, i.e., the copies can be executed by the device without being moved, modified or decrypted before being executing.

One of the copies of the firmware may turn out being defective or invalid, for example, due to an error having occurred at a memory location or after a failed attempt of update of this copy of the firmware. The device can then execute the other copy (or one of the other copies). For this purpose, the device may implement a method such as described hereafter in relation with FIG. 3.

By comparison, in the presence of a single copy of the firmware, in case of an error having occurred at a memory location or of a failed update for example having placed a portion only of the copy into the memory, the device could not have operated properly. Thus, the presence of a plurality of copies FWi of the firmware enables operation of the device despite the error having occurred in the memory or the failed update attempt. This enables an increased availability rate and/or reliability of the device. The preferred case where only two copies FWi are provided enables optimization of the tradeoff between the space occupied in the memory by copies FWi and the reliability/availability rate.

Each copy FWi occupies at least a portion of an area 210-$i$ (210-1, 210-2) of memory 200 from a position, or from a beginning address of the copy, 220-1 (220-1, 220-2). Preferably, each copy FWi leaves free, that is, does not occupy, a portion 222 of the concerned area 210-$i$, preferably located on the side of the highest logical addresses in the area. Portion 222 enables updating of the considered copy FWi by replacing it with a longer copy, without changing position 220-$i$. Areas 210-$i$ are preferably consecutive, however, as a variation, areas 210-$i$ may have any position. Each area 210-$i$ is defined by a set of consecutive memory locations, however, as a variation, each area 210-$i$ may be replaced with a plurality of separate areas located at different memory locations.

Preferably, copies FWi correspond to a same version of the firmware, that is, they cause the same operation of the device when they are valid (non-defective) and executed by processing unit 140. However, as described in relation with FIG. 3, the copies may correspond, at least temporarily, to different versions of the firmware.

Preferably, the copies FWi of a same version of the firmware are provided to cause the same sequence of operations, each operation corresponding to an instruction of the executed copy FWi. In an example, copies FWi may comprise instructions depending on the position 220-$i$ of copy FWi in memory 200, and copies FWi then preferably differ only by their instructions dependent on position 220-$i$. More precisely, the valid copies FWi differ only by the operands of their position-dependent instructions. Thus, the operators of the instructions are the same in the valid copies. In another example, copies FWi are totally independent from position 220-$i$, and are then preferably identical.

As a variation, the copies FWi of a same version of the firmware may correspond to different instructions, for example, resulting from a same source code and from compilations implemented differently.

Preferably, the memory further contains, for each of said copies FWi, a signature MACi (MAC1, MAC2) for checking the validity of the considered copy, that is, an integrity measurement. Signature MACi may be of any type enabling detection of an error in the corresponding copy FWi. Such an error corresponds to a difference of at least one bit between the copy provided to correspond to the firmware and to be stored at the considered location and the copy FWi obtained by reading the content of this location. Preferably, signature MACi is of message authentication code type, MAC. As an example, signature MACi is of cyclic redundancy check or CRC type, or of checksum type. As a variation, the signature may be replaced with any means for checking the validity of the considered copy, such as a memory and/or copy operation test, or an update failure indication. However, as compared with such variations, signature MACi enables simplification of the checking of the validity of copy FWi. Signatures MACi are for example located at locations placed at the end of memory 200 (their logic addresses being the highest of the memory locations).

Preferably, the memory further comprises a device boot program 230 (BOOT). At the starting of the device, the processing unit (140 in FIG. 1) starts by executing program 230. The execution of program 230 ends with the starting of one of the copies FWi of the firmware. Preferably, a memory location 240 contains a value SEL. Value SEL indicates, among copies FWi, a selected copy FW-SEL, or active copy, to be started as a priority with respect to the other copies FWi. Preferably, program 230 checks the validity of selected copy FW-SEL and starts this copy if it is valid. Preferably, the selected copy is a copy having had its validity checked at a previous step, for example, during its installation. An example of a method implemented during the execution of program 230 is described hereafter in relation with FIG. 3.

Preferably, the selected copy FW-SEL is a copy which, among said copies FWi, corresponds to the most recent version of the firmware. This advantageously results in the started copy corresponding to the most recent version of the firmware.

As a variation, value SEL indicating the selected copy is omitted. In this variation, to start the most recent version of the firmware, the device tests the validity of all copies FWi, compares the versions of all copies FWi, and selects and then starts the valid copy corresponding to the most recent version. As compared with such a variation, the value indicating the selected copy enables, in the case where the selected copy is valid, to perform a single validity test, which enables simplification of boot program 230 and to accelerate its execution.

Preferably, the memory further comprises a common file system 250 (FS) accessible to each of said copies. File system 250 typically comprises data used by the firmware to operate the device. An advantage of common file system 250 is that the data used is the same whatever the started copy FWi. As an example, the file system extends in the memory between copies FWi and signatures MACi.

Figure 3:
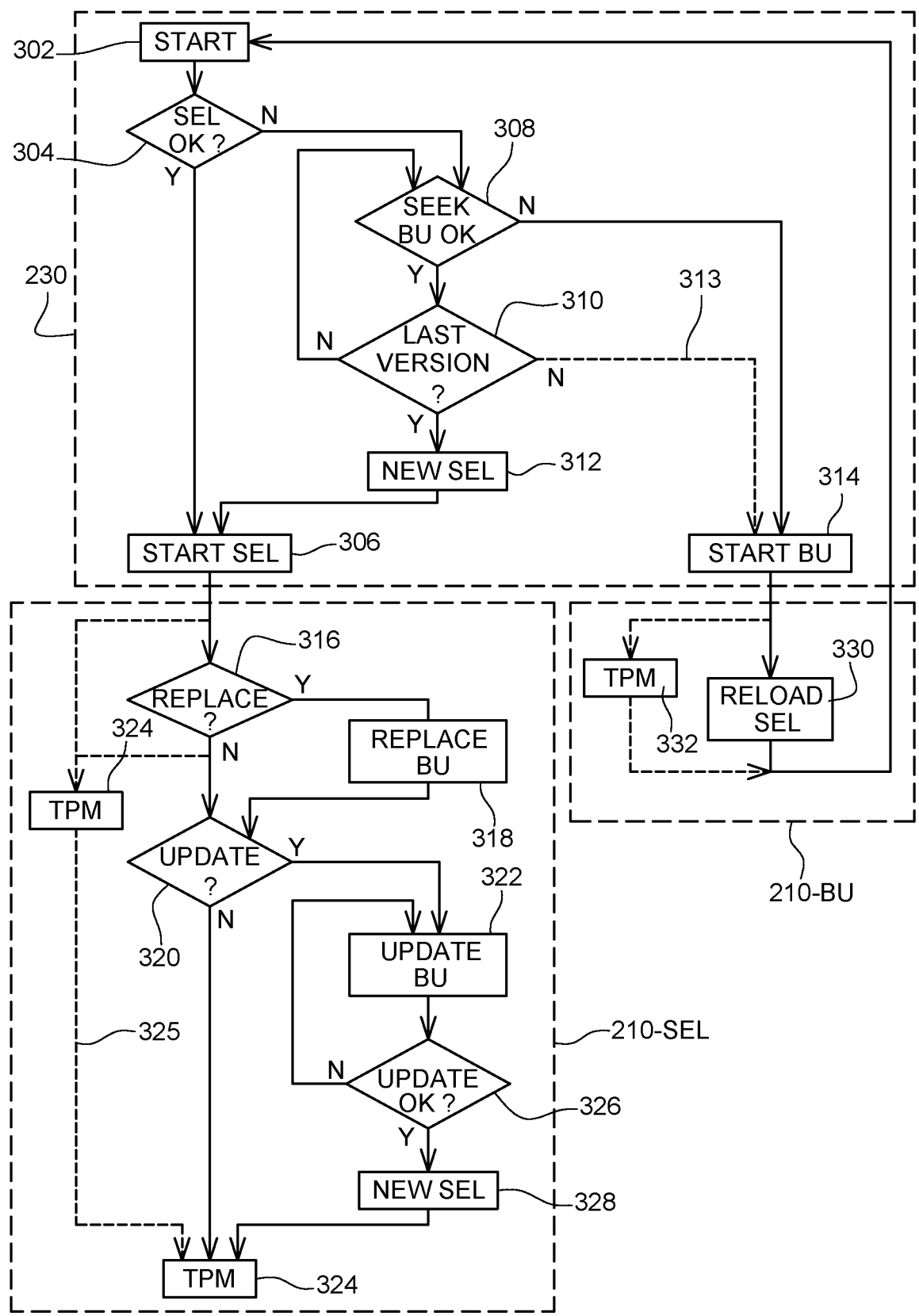
FIG. 3 schematically shows in the form of blocks an embodiment of a method implemented by a device comprising firmware.

FIG. 3 schematically shows in the form of blocks an embodiment of an operating method of a device comprising firmware comprising the memory of FIG. 2. More particularly, the blocks corresponding to steps implemented by the device during the execution of boot program 230, of the selected copy FW-SEL, and of a copy FWi different from the selected copy, are represented in respective boxes 230', 210-SEL, and 210-BU.

At a step 302 (START), the execution of boot program 230 starts and the method proceeds to a step 304.

At step 304 (SEL OK?), the device tests the validity of the selected copy FW-SEL. If the copy is valid (Y), the method proceeds to a step 306 (START SEL) of starting of the execution of the selected copy FW-SEL. If the copy is not valid (N), the method proceeds to a step 308.

At step 308 (SEEK BU OK), if this step has not been executed yet since the beginning, the device seeks, among the valid copies FWi other than the selected copy FW-SEL, a backup copy FW-BU. The method then proceeds to a step 310.

At step 310 (LAST VERSION?), the device tests whether the version of backup copy FW-BU is the most recent version. To achieve this, in the preferred case where the most recent version is that of selected copy FW-SEL, it is sufficient to compare the versions of the selected copy FW-SEL and of backup copy FW-BU. If the versions are equal (Y), the method proceeds to a step 312. Otherwise, the method returns to step 308 or, in the case where the memory only contains two copies, the method proceeds to a step 314 (dotted lines 313).

At a new execution of step 308, the device seeks a new backup copy FW-BU among the valid copies FWi other than the selected copy FW-SEL and other than the previous copy or copies FW-BU. If a new copy FW-BU is found (Y), the method proceeds to step 310. Otherwise, the method proceeds to step 314.

At step 312 (NEW SEL), the method modifies the value SEL of location 240. Copy FW-BU, which is valid and corresponds to the most recent value, becomes the new selected copy FW-SEL to be executed as a priority. The method then proceeds to above-described step 306.

At step 314 (START BU), the method starts backup copy FW-BU.

After step 306, the method preferably goes through a step 316 (REPLACE?). Step 316 and the steps following step 316 are implemented during the execution of the selected copy FW-SEL.

Step 316 is executed when a request is received by the device. To achieve this, the device communicates via a platform with a system such as a server. The communication is for example carried out over a remote communication network such as the Internet, and may also be carried out by any communication mode adapted to the communication between the device and the server via a platform. At step 316, the device sends information indicating whether the copy selected before step 304 was valid or not. If, after this, the device receives a request to replace one or a plurality of invalid copies (Y), the method proceeds to a step 318. If the device receives no replacement request (N), the method proceeds to a step 320.

At step 318 (REPLACE BU), the device replaces the copy or copies which are invalid and/or correspond to a version different from the most recent one. More precisely, preferably, the device receives from the server a new copy intended to replace the invalid copy. As a variation, in the case where the selected copy FW-SEL is independent from its position in the memory, an identical copy of the selected copy FW-SEL is provided at the location of the copy to be replaced. Preferably, the device then replaces the check signature of the replaced copy with that of the selected copy FW-SEL. In this variation and in the case where the selected copy FW-SEL comprises position-dependent instructions, the copy is achieved by modifying these instructions. The device calculates the new check signature MACi of the replaced copy FWi and stores the signature at its location in the memory. The embodiments of the method are compatible with usual steps of writing into a memory a copy, or an instance, or a program depending on its position from another copy of the program. Step 318 enables for the copies to be valid and to correspond to the most recent version.

Step 320 (UPDATE?) is preferably implemented when a request to execute this step is received by the device. At this step, the device tests whether an update of the firmware should be performed. For this purpose, the device communicates with the server via the platform. If an update is to be performed (Y), the method proceeds to a step 322 (UPDATE BU). Otherwise (N), the method proceeds to a step 324.

At step 322, the device updates a copy other than the selected copy FW-SEL. In other words, the device replaces the copy other than the selected copy FW-SEL with a copy corresponding to a more recent version than that of the selected copy FW-SEL. An example of an implementation mode of this step is described hereafter in relation with FIGS. 4 to 6. After step 322, the device for example proceeds to a step 326, at which the device checks that the updated copy is valid. If the copy is valid (Y), the method proceeds to a step 328 (NEW-SEL). Otherwise, the method may as an example return to step 322 to attempt performing an update again. As a variation, the method may proceed to step 318, to restore the copy for which the update has failed.

At step 328, the method modifies value SEL (FIG. 2) to indicate that the copy updated at step 322 will have to be started in priority at the next starting of the device. Thus, the updated copy will become the new selected copy FW-SEL at the next start, the new copy corresponding to the new most recent version of the firmware. Step 316 will then enable, after this next start, to update all the copies of the firmware. The method proceeds to step 324 after step 328.

Step 324 (TPM) corresponds to the operation of the device after the start and outside updates and replacements of copies FWi. As mentioned, this operation is preferably in accordance with the TPM standard.

Although the steps implemented during the execution of the selected copy (box 210-SEL) have been shown in a specific order, other arrangements of the steps are possible. In particular, steps 316, 318, 320, 322, 326, and 328 may be carried out in parallel with part of step 324 (dotted lines 325) and/or after part of this step (not shown). Further, steps 316 and 318 may be omitted, in particular in the absence of a request, the method directly passing from step 306 to step 320. Similarly, steps 320, 322, 326, and 328 may be omitted, in particular in the absence of a request, the method directly passing from step 306 or 316 to step 324.

After step 314 (START BU), the method preferably goes through a step 330 (RELOAD SEL). At this step, the device updates the selected copy FW-SEL. In other words, the device replaces the selected copy, invalid in the present case, with a new version of the firmware. This step is preferably carried out identically or similarly to that of update step 322, that is, by preferably using a communication with a server. After step 330, the device restarts (the method returns to step 302). Step 330 may be carried out in parallel with a step 332 (TPM) at which the device ensures at least part of, preferably only part of, the functions of steps 324 (TPM).

Figure 4:
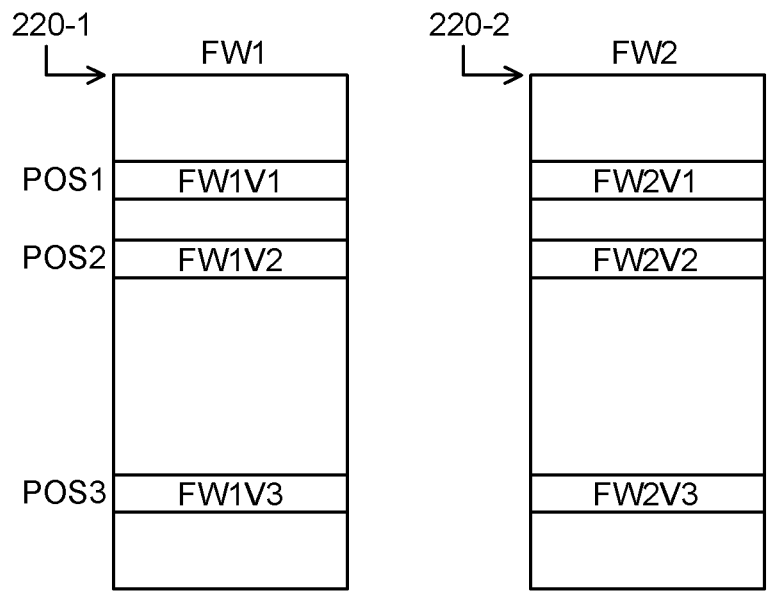
FIG. 4 schematically shows a step of an embodiment of a firmware update method.
Figure 5:
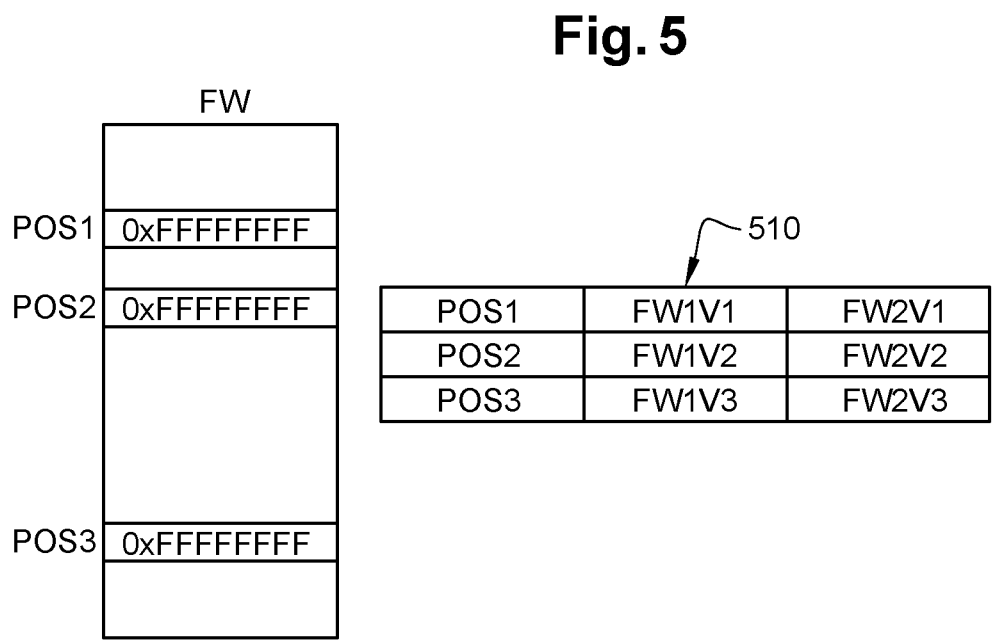
FIG. 5 schematically shows another step of the method.
Figure 6:
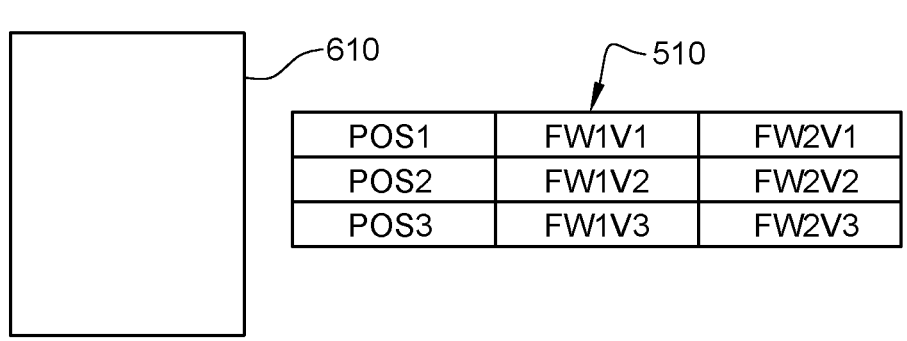
FIG. 6 schematically shows another step of the method.

FIGS. 4, 5, and 6 schematically show steps of an embodiment of a firmware update method. More precisely, the method may be implemented at the steps 322 and/or 330 described hereinabove in relation with FIG. 3, to update copies of firmware stored in memory 200 (FIG. 2) of a device comprising firmware.

The step of FIG. 4 is preferably implemented by a system external to the device comprising the firmware to be updated. Such a system is preferably a computer information system, for example comprising a computer, intended to communicate with the device to perform the update.

At the step of FIG. 4, copies FWi of the firmware are formed, preferably two copies FW1 and WF2. The two copies preferably correspond to the same most recent version of the firmware. Copies FWi are capable of being stored in memory 200 (FIG. 2) of the device from respective positions 220-*i* (220-1 and 220-2). The copies may differ by position-dependent instructions. Copies FW1 and FW2 then differ by a number M of values FWiVj, such as words (a word being defined by a given number of bits, preferably 32 bits). These values are at positions located with offsets POSj from position 220-*i*,*j* being an integer varying from 1 to M. In the shown example, copies FW1 and FW2 differ by values FW1V1 and FW2V1, FW1V2 and FW2V2, FW1V3 and FW2V3 corresponding to respective offsets POS1, POS2, and POS3. Each offset POSj is common to copies FWi. Positions POSj may be obtained by comparing copies FW1 and FW2. As a variation, a single copy is formed and offsets POSj are obtained by locating the positions of the position-dependent values.

At the step of FIG. 5, an additional copy FW is formed where, at the positions corresponding to offsets POSj, the values are replaced with a same predefined value. Preferably, when memory 200 is a Flash memory, the predefined value has all its bits equal to an erase value of memory 200, that is, a value contained at a location of memory 200 after it has been erased, for example, value 1. The predefined value thus is for example, in the case of 32-bit words, equal to value 0xFFFFFFFF (where "0x" indicates that the notation is hexadecimal).

A set 510 of values, preferably organized in the form of a table, is further formed. Set 510 comprises values FWiVj for at least one of the copies FWi to be updated, preferably corresponding to another column in the table. Preferably, set 510 comprises all values FWiVj, where each value of integer i corresponds to a column (each value of integer j corresponds to a row). Set 510 preferably comprises offsets POSj, more preferably corresponding to a column in the table. The columns and the rows of the table may be exchanged.

At the step of FIG. 6, additional copy FW is compressed. This step is compatible with usual data compression steps. Preferably, the compression enables, from additional copy FW, to obtain a set 610 of data of smaller size with respect to that of the additional copy, with no loss of information. As an example, the size of set 610 is smaller by 85% than that of additional copy FW. As an example, additional copy FW has a size greater than or equal to 310 kilobytes, and the compressed set 610 has a size smaller than 260 kilobytes.

Preferably, set 510 is not compressed, however, a compression a set 510 is possible.

At a next step, not shown, sets 510 and 610 are transmitted to the device having firmware to be updated. Preferably, the device decompresses set 610 as it receives it and stores the result of the decompression, that is, additional copy FW, directly at the location of the copy FWi to be replaced. As a variation, the step of FIG. 6 is omitted and additional copy FW is received by the device in non-compressed form.

In a variation, the device places set 610 into memory 200 or into another memory before decompressing it. However, as compared with this variation, the fact of decompressing set 610 as it is being received enables to decrease the memory space used. In another variation, the device stores the decompressed copy in another memory or at another location in memory 200 than that of the copy to be replaced. However, as compared with this other variation, the fact of storing the result of the compression directly at the location of the copy to be replaced also enables to decrease the memory space used.

The device then replaces the predefined values substituted to the position-dependent values FWiVj with the corresponding values of the set 510 received by the device. The values FWiVj obtained at the step of FIG. 4 have thus been restored in the concerned copy FWi and this copy has thus been updated.

In the case of a Flash-type memory, portions of the decompressed copy are successively stored. For each of these portions, the memory locations are simultaneously erased, after which the concerned portion is simultaneously rewritten into all the locations.

In another variation, the decompressed copy may be stored in another memory, for example, a RAM, and the predefined values may then be replaced with values FWiVj when the copy is in the RAM, after which the copy may be rewritten into the Flash memory. As compared with this variation, the writing into the memory of the predefined values with bits equal to an erase value of the Flash memory, followed by their replacement with values FWiVj, enables to avoid using space in the RAM without adding a write/erase cycle to the Flash memory. This enables to decrease the size of the RAM and to limit risks of aging of the Flash memory and/or the update time.

The method of FIGS. 4 to 6 enables the device to receive all the data necessary to update any of the copies FWi having its position-dependent values FWiVj contained in set 510. In particular, in the preferred case where set 510 comprises all the values FWiVj, the device receives all the values necessary for the update of any of copies FWi. More precisely, sets 510 and 610 may advantageously be obtained in advance without knowing which of the copies is to be updated or without for the device to have to communicate an indication of the copy to be updated.

To transmit to the device data necessary for the update of any of the copies without knowing in advantage which of the copies is to be updated, it could have been devised to transmit all the copies FWi obtained at the step of FIG. 4. However, by comparison, the method of FIGS. 4 to 6 has the advantage of decreasing the number of data transmitted for the updated. The update can thus be performed faster and/or by communication means having a narrower bandwidth.

Various embodiments and variations have been described. It will be understood by those skilled in the art that certain features of these various embodiments and variations may be combined, and other variations will occur to those skilled in the art.

Finally, the practical implementation of the described embodiments and variations is within the abilities of those skilled in the art based on the functional indications given hereinabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electronic component comprising:
 a package having external electrically-conductive pins;
 a non-transitory, non-volatile memory disposed on an integrated circuit chip in the package, the memory storing:
  a plurality of copies of at least one version of a same firmware of the component; and
  for each copy of the at least one version of the same firmware, an integrity signature for checking a validity of the copy; and
 a central processing unit disposed on the integrated circuit chip in the package and communicatively coupled to the memory, wherein each of the copies of the same firmware is configured to cause the central processing unit to execute an operation of the component according to a trusted platform module (TPM) standard, and wherein the central processing unit is configured to:
  receive an additional copy of the same firmware, wherein values depending on a future position of the additional copy in the memory are replaced with a same predefined value;
  receive dependent values for each position of the copies in the memory;
  replace at least one of the copies with the additional copy; and
  restore the dependent values corresponding to the position of the additional copy.

2. The component of claim 1, wherein the memory further comprises a program for starting the component, and wherein the program is configured to cause the central processing unit to execute a verification of a validity and execution of at least one of the copies.

3. The component of claim 1, wherein the memory comprises a value indicating a copy selected from among the copies.

4. The component of claim 3, wherein the selected copy corresponds to a most recent version of the firmware.

5. The component of claim 1, wherein the memory further comprises a common file system accessible to each of the copies.

6. A method of operating an electronic component comprising a package having external electrically-conductive pins, a central processing unit disposed on a first integrated circuit chip in the package, and a non-volatile memory disposed on a second integrated circuit chip in the package and different from the first integrated circuit chip, the non-volatile memory containing a plurality of copies of at least one version of a same firmware of the component, the method comprising:
 storing, by the central processing unit in the package in the non-volatile memory in the package, for each copy of the at least one version of the same firmware, an integrity signature for checking a validity of the copy;
 receiving, by the component, an additional copy of the same firmware, wherein values depending on a future position of the additional copy in the memory are replaced with a same predefined value;
 receiving, by the component, dependent values for each position of the copies in the memory;
 replacing at least one of the copies with the additional copy;
 restoring the dependent values corresponding to the position of the additional copy;
 determining, by the central processing unit in the package, that a first copy of the copies of the same firmware is valid and corresponds to a most recent version of valid copies; and executing, by the central processing unit in the package, the first copy of the copies to cause an operation of the component according to a trusted platform module (TPM) standard.

7. The electronic component of claim 1, wherein the non-transitory, non-volatile memory is a flash memory.

8. The method of claim 6, wherein each of the valid copies is capable of causing, when executed by the component, the operation of the component according to the TPM standard.

9. The method of claim 6, comprising replacing a copy which, among the copies, is non-valid, with another copy which, among the copies, is valid.

10. The method of claim 6, comprising replacing one of the copies with another one of the copies corresponding to a more recent version than that of the replaced copy.

11. The method of claim 6, further comprising:
receiving the additional copy in compressed form; and
decompressing the additional copy.

12. The method of claim 6, wherein the predefined value has all of its bits equal to a memory erase value.

13. An electronic component comprising:
a package having external electrically-conductive pins;
a central processing unit disposed on a first integrated circuit chip in the package;
a non-volatile memory disposed on at least one second integrated circuit chip in the package, wherein the at least one second integrated circuit chip is different from the first integrated circuit chip, and wherein the non-volatile memory is communicatively coupled to the central processing unit;
a plurality of copies of at least one version of a same firmware of the component, stored in the non-volatile memory, wherein each of the copies of the same firmware is configured to cause the central processing unit to execute an operation of the electronic component according to a trusted platform module (TPM) standard; and
for each copy of the at least one version of the same firmware, an integrity signature, stored in the non-volatile memory, for checking a validity of the copy;
wherein the central processing unit is configured to:
receive an additional copy of the same firmware, wherein values depending on a future position of the additional copy in the memory are replaced with a same predefined value;
receive dependent values for each position of the copies in the memory;
replace at least one of the copies with the additional copy; and
restore the dependent values corresponding to the position of the additional copy.

14. The electronic component of claim 13, wherein the memory further comprises a program for starting the electronic component, the program configured to cause the central processing unit to execute a verification of a validity and execution of at least one of the copies.

15. The electronic component of claim 13, wherein the memory comprises a value indicating a copy selected from among the copies.

16. The electronic component of claim 15, wherein the selected copy corresponds to a most recent version of the firmware.

17. The electronic component of claim 13, wherein the memory further comprises a common file system accessible to each of the copies.

18. A method of operating an electronic component comprising a package having external electrically-conductive pins, a central processing unit disposed on an integrated circuit chip in the package, and a non-volatile memory disposed on the integrated circuit chip and containing a plurality of copies of at least one version of a same firmware of the component, the method comprising:
storing, by the central processing unit on the integrated circuit chip in the non-volatile memory on the integrated circuit chip, for each copy of the at least one version of the same firmware, an integrity signature for checking a validity of the copy;
receiving, by the component, an additional copy of the same firmware, wherein values depending on a future position of the additional copy in the memory are replaced with a same predefined value;
receiving, by the component, dependent values for each position of the copies in the memory;
replacing at least one of the copies with the additional copy;
restoring the dependent values corresponding to the position of the additional copy;
determining, by the central processing unit on the integrated circuit chip, that a first copy of the copies of the same firmware is valid and corresponds to a most recent version of valid copies; and
executing, by the central processing unit on the integrated circuit chip, the first copy of the copies to cause an operation of the component according to a trusted platform module (TPM) standard.

19. The method of claim 18, further comprising:
receiving the dependent values in compressed form; and
decompressing the dependent values.

* * * * *